(12) United States Patent  
Rolle

(10) Patent No.: US 6,358,032 B1  
(45) Date of Patent: Mar. 19, 2002

(54) MACHINE FOR THE PRODUCTION OF PLASTIC RECEPTACLES

(75) Inventor: Jean-Claude Rolle, Bulle (CH)

(73) Assignee: Tetra Laval Holdings & Finance SA, Pully (CH)

( * ) Notice: Subject to any disclaimer, the term of this patent is extended or adjusted under 35 U.S.C. 154(b) by 15 days.

(21) Appl. No.: 09/671,299

(22) Filed: Sep. 28, 2000

(30) Foreign Application Priority Data

Nov. 9, 1999 (CH) ............................................. 2052/99

(51) Int. Cl.[7] ............................................. B29C 49/68
(52) U.S. Cl. ........................ 425/182; 425/526; 425/534
(58) Field of Search .................. 425/534, 526, 425/174.4, 182, 186; 432/3, 76

(56) References Cited

U.S. PATENT DOCUMENTS

| | | | | |
|---|---|---|---|---|
| 3,339,230 A | * | 9/1967 | Farrell | 425/526 |
| 3,995,990 A | * | 12/1976 | Dwyer et al. | 432/121 |
| 5,121,828 A | | 6/1992 | Wiatt et al. | 198/465.4 |
| RE34,177 E | * | 2/1993 | Coxhead et al. | 432/5 |
| 5,516,274 A | * | 5/1996 | Maggert | 425/526 |
| 5,549,468 A | * | 8/1996 | Mitchell et al. | 425/526 |
| 5,876,768 A | | 3/1999 | Collombin | 425/526 |
| 5,980,229 A | * | 11/1999 | Collombin | 425/174.4 |
| 6,005,223 A | * | 12/1999 | Ogihara | 264/535 |

FOREIGN PATENT DOCUMENTS

| | | |
|---|---|---|
| EP | 0387737 A1 | 9/1990 |
| EP | 0450482 A2 | 10/1991 |
| EP | 0480652 A1 | 4/1992 |
| EP | 0798094 A1 | 10/1997 |
| WO | WO 9713632 A1 | 4/1997 |

* cited by examiner

*Primary Examiner*—Robert Davis  
(74) *Attorney, Agent, or Firm*—Young & Thompson

(57) ABSTRACT

The machine for the production of plastic receptacles comprises a heating device (10) in which the pre-forms are heated before being sent to a drawing-blowing device. This heating device (10) has heating elements (70) located between two rows of pre-forms and distributed in two heating bodies (85) mounted one after the other on a sliding mechanism (95) comprising telescopic tubes permitting individually withdrawing and reinserting the heating elements (70) of the heating device (10). The maintenance and adjustment of the heating elements (70) are thus greatly facilitated and the down time of the machine greatly reduced.

14 Claims, 4 Drawing Sheets

MACHINE FOR THE PRODUCTION OF PLASTIC RECEPTACLES

The present invention relates to a machine for the production of plastic receptacles comprising a chassis and arranged along a guide path at least one heating device and a blow-molding device, the receptacles being formed from pre-forms disposed on conveyors moved in one direction of movement along the guide path, the heating device comprising heating elements mounted facing at least one row of pre-forms.

There are known such machines described for example in WO 97/13632. The machine described in this latter document has a heating device with several rows of parallel pre-forms. Heating tubes are disposed between two rows of pre-forms to heat these latter. When it is desired to change the tubes or to adjust their position, it is necessary to stop the heating device and to immobilize the machine for a prolonged period until a temperature suitable for handling the heating elements is reached. Then, the operations of maintenance and adjustment are difficult to carry out because the heating elements are disposed at the center of the machine and are therefore difficult of access. The known machine therefore requires prolonged down periods and complicated and impractical handling and adjustment operations.

U.S. Pat. No. 5,121,828 discloses a machine for the production of articles from pre-forms comprising a chassis with a base which has rails on which an oven for heating the pre-forms is mounted in a slidable manner. The assembly of the oven can thus be moved slidingly on the rails relative to its base. However, when a single heating tube is to be replaced or adjusted, it is necessary to withdraw and remove the assembly from the oven. Moreover, if this tube to be replaced is located in the middle of the oven, the access to this tube is far from being easy. It is necessary to wait until the temperature of the heating elements has reached a sufficiently low level to permit an operation of repair or adjustment. The down time for operations and maintenance and adjustment therefore becomes long even for this type of machine.

The present invention has for its object to overcome these drawbacks, and the machine according to the present invention is characterized to this effect by the fact that the heating device comprises, associated with the different rows of pre-forms, sliding mechanisms arranged so as to permit withdrawing and reintroducing individually the heating elements of a predetermined row relative to other heating elements associated with other rows of pre-forms and relative to a fixed frame of the heating device.

Thanks to these characteristics, it is possible to withdraw the heating elements of the heating device by simple sliding in the manner of a drawer, which assures easy access to the heating elements, and hence facilitated maintenance and adjustment of these heating elements. The cooling of these latter outside the heating device is moreover swifter, which significantly shortens the down time of the machine during operations of maintenance and/or adjustment.

According to a preferred embodiment, the machine comprises pairs of parallel rows of pre-forms at the level of the heating device and is characterized by the fact that the heating elements are disposed between the pairs of parallel rows and mounted on sliding mechanisms such that the heating elements associated with a pair of parallel rows can be withdrawn from the heating device relative to other heating elements associated with the other pairs of parallel rows by sliding in said direction of movement.

These characteristics permit easy removal of the heating elements for maintenance and adjustment.

Preferably, the sliding mechanism comprises two telescopic devices fixed above the two rows of pre-forms to the frame of the heating device, the heating elements being suspended from cross-pieces connecting the two telescopic devices.

There is obtained by these characteristics a particularly simple construction, a reliable operation and a reduced size.

Preferably, the heating elements are distributed in two heating bodies arranged one behind the other on the sliding mechanism separated by a predetermined distance.

The two heating separated heating bodies can thus be adjusted individually rapidly and easily, which permits an adaptation of the heating device to the production of receptacles and other hollow bodies, of different shapes and sizes and compositions.

In a preferred embodiment, each heating body comprises two parallel series of heating tubes substantially superposed and mounted facing two rows of pre-forms on vertical suspension bars connected to the sliding mechanism.

There is thus obtained a very efficacious and precise heating of the pre-forms, whilst having a construction greatly facilitating maintenance and adjustment of the heating elements.

The heating tubes are preferably mounted adjustably on suspension bars such that the distance separating the pre-forms can be individually adjusted.

These characteristics permit obtaining and adjusting heating profiles along the axis of the pre-forms assuring high quality of the produced products.

According to a preferred modification, the heating device comprises a frame with feet whose length can be adjusted by a simple mechanism with pinions and a chain such that the position of the assembly of heating elements relative to the pre-forms can be adjusted vertically.

An adaptation of the heating device to pre-forms of different lengths can thus be obtained in a rapid and precise manner.

Preferably, the heating device comprises at least three sliding mechanisms disposed parallel to each other and whose heating elements are disposed in the middle of three pairs of rows of pre-forms, each sliding 85 mechanism being arranged so as to permit withdrawing individually the heating elements located between two adjacent rows of pre-forms.

There is thus obtained a rapid and easy maintenance and adjustment, even in the environment of a heating device of large size having at least six parallel rows of pre-forms.

A preferred embodiment of the invention is characterized by the fact that the heating device comprises at least four successive zones arranged along the direction of movement, and ventilation means adapted to send an air flow along the surface of the pre-forms, a first zone comprising heating elements adapted to produce heating of the pre-forms, a second zone permitting balancing the thermal conditions of the wall of the pre-forms by cooling their external surface, a third zone comprising heating elements adapted to produce a second heating of the pre-forms and a fourth zone permitting a final balancing of the thermal conditions of the pre-forms before their transfer to the blow-molding device, the heating device having ventilation means in the heating zones and in the balancing zones, these ventilation means being arranged so as to send an air flow oriented perpendicularly to the surfaces of the pre-forms in the balancing zone and in the two heating zones, these latter having positions in which the pre-forms are simultaneously subjected to heating radiation and to said air flow.

Thanks to these characteristics, it is possible to obtain an optimum differential heating of the wall of the pre-forms, namely a given thermal profile through the wall of the pre-forms. There can thus be obtained an external surface at a lower temperature than the internal surface of the pre-form. The invention therefore permits obtaining an optimized thermal distribution for pre-forms ensuring a very regular expansion during the subsequent drawing-blowing operation.

Preferably, each of the four zones comprises a predetermined number of stop positions in which the pre-forms are stopped during predetermined time intervals, the ventilation means being arranged so as to direct in the stop positions a substantially vertical flow of air in the direction of the pre-forms, which are rotated about their longitudinal axes by means of at least one drive device.

The combined and successive heating-cooling actions and cooling alone, in the precisely determined stop positions of the pre-forms, ensure a particularly precise thermal distribution for the pre-forms, hence a very regular moving of the receptacles.

Preferably, the machine is characterized by the fact that the heating device is arranged so as to carry out in the first zone a heating and a ventilation such that the external surface of the pre-forms is at a temperature higher than that of the internal surface, to carry out in the second zone a balancing by ventilation such that the temperature of the external surface becomes lower than that of the internal surface, to carry out in the third zone a ventilation and general heating of the pre-form less pronounced than in the first zone, and to carry out in the fourth zone balancing conditions by ventilation such that the temperature of the external surface is lower than the internal temperature of the pre-forms at the outlet of the heating device.

Thanks to these characteristics, the temperature of the internal and external surfaces of the pre-forms can be adjusted in a precise manner whilst obtaining a predetermined temperature profile through the walls of the pre-forms, which ensures a particularly regular drawing-blowing operation and receptacles of very high quality.

Other advantages will become apparent from the characteristics set forth in the dependent claims and from the description given hereafter of the invention in greater detail with the help of drawings which show schematically and by way of example one embodiment.

Figure 1:
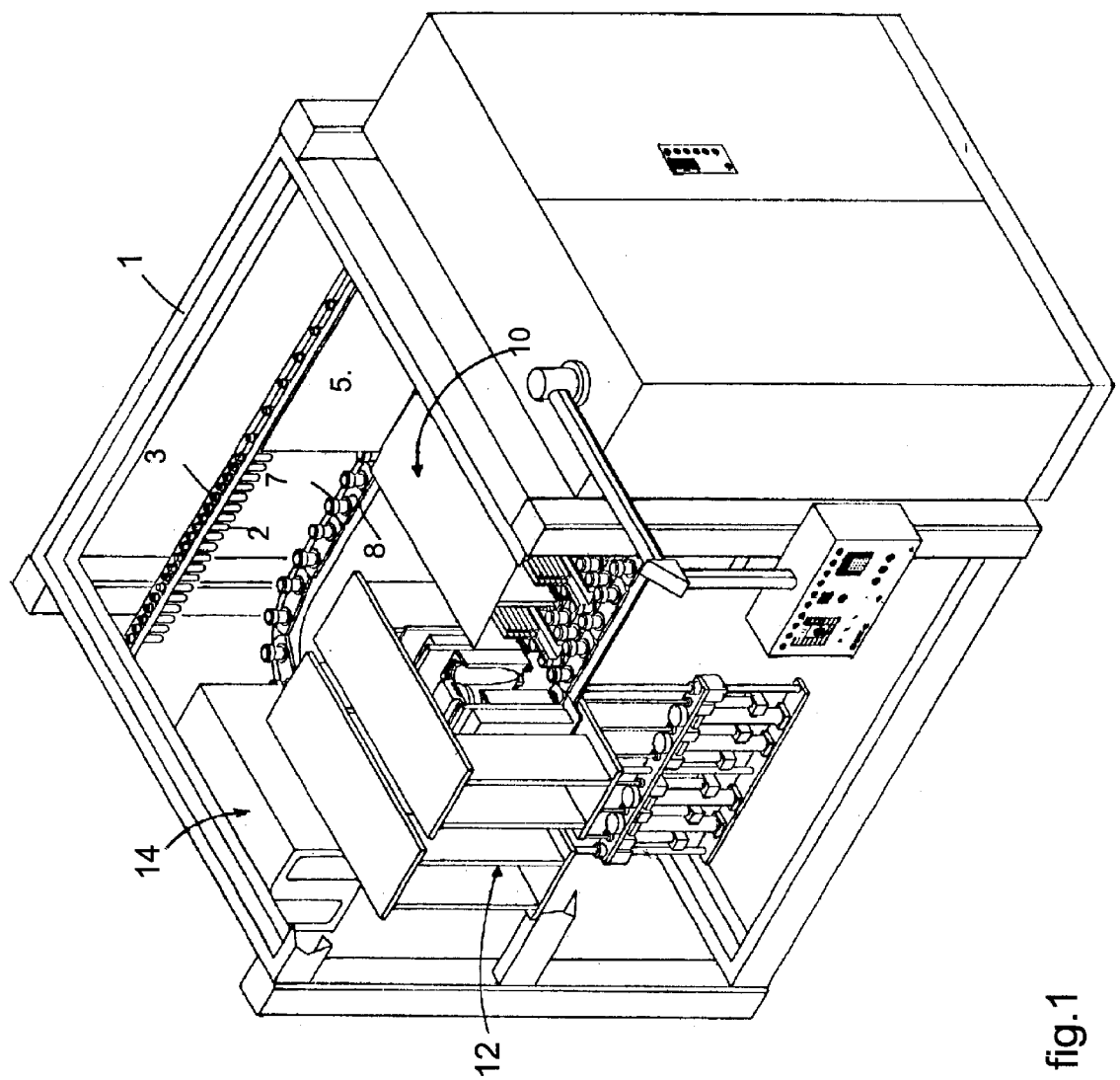
FIG. 1 is a perspective view of this embodiment of the machine.
Figure 2:
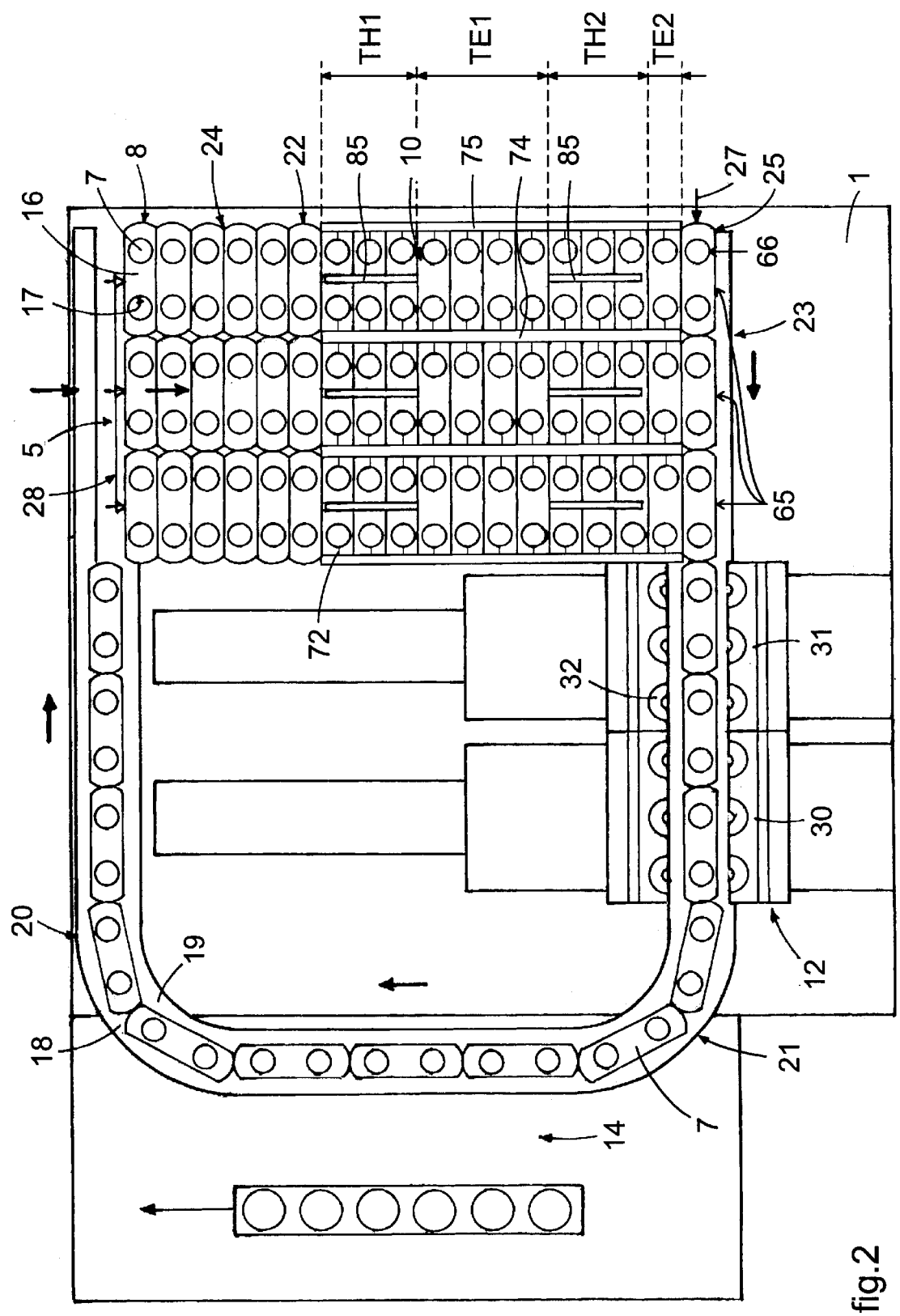
FIG. 2 is a fragmentary schematic plan view of this embodiment.

With reference to FIGS. 1 and 2, the machine for the production of receptacles of plastic material comprises a chassis 1 on which the different devices and members of the machine are mounted in modular fashion. The pre-forms 2 for receptacles to be produced are supplied by means of a double rail 3 (FIG. 1) forming an incline plane to arrive in an inverting loading device 5, in which the pre-forms are inverted and disposed neck-down on supports 7 carried by conveyors 8, each conveyor having two supports 7.

The pre-forms 2 are then heated in a heating device 10 and moved toward a drawing-blowing device 12. After their formation, the receptacles are moved from the supports 7 in an inverting unloading device 14, from which they can be packaged for their future use or sent to stations for sterilization, filling, labelling, packaging, etc.

The empty supports 7 carried by the conveyors 8 are then sent to the loading device 5 for the pre-forms.

The conveyors 8 are constituted by plates 16 of elongated rectangular shape with rounded ends comprising two recesses 17 in which the supports 7 are carried. The plates 16 rest laterally on a guide track 20 comprising two lateral rails 18, 19 and touch each other. This guide path comprises two separate portions 21, 22 (FIG. 2).

In a first portion 21, the plates 16 touch at their rounded ends and are aligned one behind the other forming a single row of supports 7 and pre-forms 2.

On the contrary, in a second portion 22 of the guide path 20, located at the level of the heating device 10, the plates 16 touch by their long sides and form three rows of parallel plates, hence six parallel rows of supports 7, the two supports 7 of each conveyor 8 being aligned in a direction perpendicular to the direction of movement of the conveyors.

Of course the number of parallel rows of conveyors 8 at the level of the heating device could be less than or greater than three, according to the uses and the size of the machine. This portion 22 will nevertheless comprise at least two parallel rows of supports 7 aligned in the direction of movement and encompassing the extent of the guide path in the heating device 10, as well as its inlet 24 and its outlet 25.

The movement of conveyors 8 in the first and second portions 21, 22 of the guide path is obtained by pushing by means of jacks schematically indicated at 27 and 28. Given that this guide path 20 constitutes a closed circuit, the linear speed of movement is six times greater in the first portion 21 relative to the second portion 22. This permits gradual and optimum heating of the pre-forms during a prolonged period. As the heating phase of the pre-forms requires a longer duration than the other phases and operations of this application, there is obtained a continuous operation with a very high output, whilst reducing the length of the fabrication path and hence the overall size of the machine.

Figure 3:
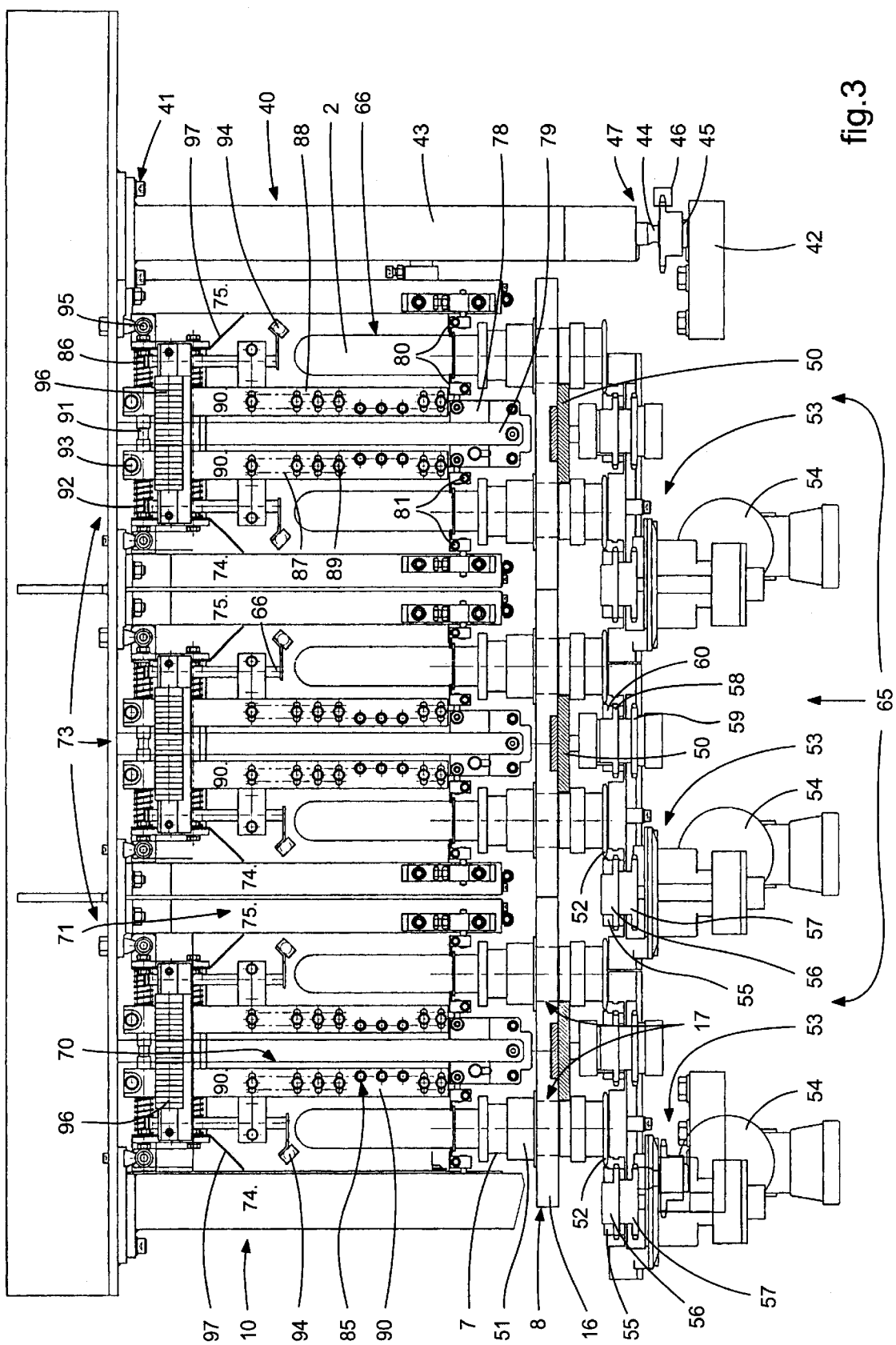
FIG. 3 is a front view of the heating device integrated into this embodiment.

The construction of the heating device 10 is explained in greater detail with reference to FIGS. 3 and 4 and comprises a housing 40 with an upper frame 41 mounted on a base 42 secured to the chassis 1 of the machine. The frame 41 comprises feet 43, of which only one is shown in FIG. 3. These feet are provided at their end with a screw-threaded rod 44 adapted to coact with the pinion 45 rotatably mounted on the base 42 and comprising an internal screw-thread. A chain 46 surrounds all the pinions 45 of the feet 43 of the frame 41 and can be driven by means of a motor (not shown). This latter, the chain, the 195 pinions and the screw-threaded rods therefore constitute an adjustment mechanism 47 permitting raising or lowering the frame 41 relative to the base 42.

The plates 16 of the conveyors 8 rest at the level of the heating device 10 on a guide rail 50 (FIG. 3). The pre-forms 2 are disposed neck-down in the upper portion of the supports 7 which comprise a tubular body 51 with an axial blowing channel. The two recesses 17 of the plates 16 form bearings thanks to which the supports 7 can turn about their axes. These supports 7 are provided at their lower end with a pinion 52 adapted to coact with chain drive members 53 provided at the level of the heating device 10. These members 53 comprise a motor 54 arranged so as to drive a chain 55 stretched between pinions 56. This chain 55 coacts with the pinions 52 of the supports 7 of a first row to rotate these supports. A pinion 57 secured to the pinion 56 serves to drive a pinion 58 over which is stretched a second chain 60 adapted to drive in rotation the supports 7 of the adjacent row of pre-forms. The connection between the pinion 57 and the pinion 58 is thanks to a transverse chain (not shown) and a 210 pinion 59 secured to the pinion 58. In the illustrated embodiment, drive members 53 with a motor 54 are provided for each of the three pairs 65 of rows 66 of pre-forms. The drive members 53 and the guide rails 50 are mounted on the base 42.

The upper frame 41 carries the assembly of the heating elements 70 and ventilating elements 71 for the pre-forms 2, which are distributed in three parallel identical units 73. Each unit comprises ventilation elements in the form of two lateral ventilating chambers 74, 75 disposed on the outer side of the pair 65 of rows of pre-forms. These chambers are provided with a certain number of ventilating slots (not shown) arranged vertically so as to generate flat vertical flows 72 (FIG. 2) of cooling air directed against the pre-forms 2 which are located in stop positions facing the slots. The ventilating chambers 74, 75 are fixed rigidly to the frame 41 and supplied with cooling air that is dried or not, by conduits 76 (FIG. 4).

The ventilating elements moreover comprise one central ventilating conduit 78 per parallel unit 73 disposed between the upper portions of the supports 7 of the two rows 66 and suspended from the frame 41 by means of vertical suspension bars 79. Through suitable openings in the central ventilating conduit 78, cooling air flows are directed in the direction of the supports 7 and the necks of the pre-forms 2 to avoid prejudicial heating of these portions. Protective shields 80 are moreover mounted in a height-wise adjustable fashion on ventilating chambers 74, 75 and on the central ventilating conduits 78 and protect the supports 7 from direct thermal radiation. These shields 80 are moreover cooled by a water cooling circuit 81.

The heating elements 70 comprise for each unit 73 two heating bodies 85 mounted at predetermined distances from each other. Each heating body 85 is suspended from cross-members 86 and comprises two series 87, 88 of longitudinal substantially superposed heating tubes 89. These heating tubes 89 are mounted on vertical suspension bars 90 fixed on the cross-pieces 86 by means of levelling members 91, two springs 92 and blockers 93.

All, or at least the three upper heating tubes and the two lower ones, are mounted adjustably on the suspension bars 90 such that the distance separating them from the pre-forms can be individually adjusted.

Each series 87, 88 moreover has a supplemental heating tube 94 whose position can be adjusted in two perpendicular directions. Terminals 96 ensure the electric supply of heating tubes 89.

The cross-pieces 86 are fixed on each side to telescopic tubes 95 permitting completely and individually withdrawing each of the heating elements 70 with its two heating bodies 85 in a longitudinal direction parallel to the heating tubes of the heating device 10 and to the direction of movement x. It is thus possible to withdraw the heating elements slidably in the manner of a drawer, from the heating device. This construction thus permits easy maintenance and very rapid adjustment of the heating bodies and their tubes because the access to the heating tubes of a given unit 73 is in the immediate outlet position of the heating elements 70 (FIG. 4).

Each heating body 85 moreover comprises protective shields 97 mounted above the two series 87, 88 of heating tubes.

Figure 4:
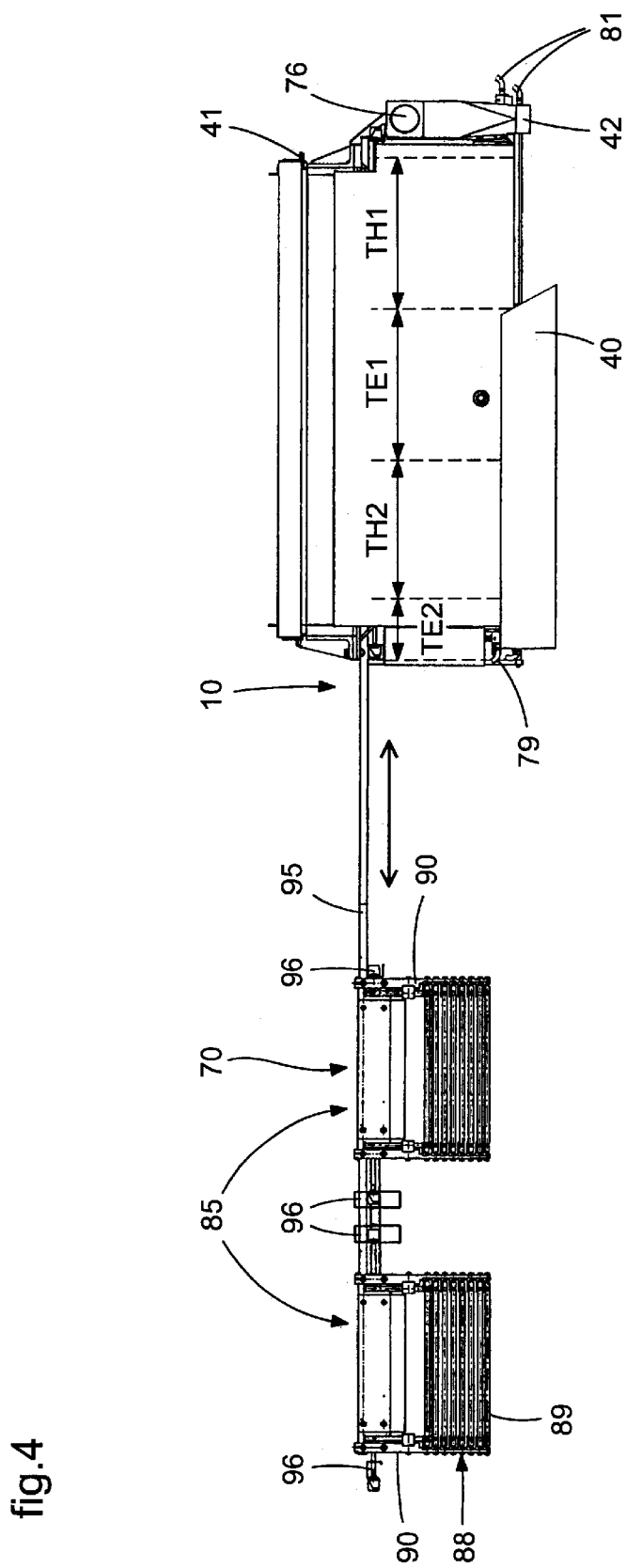
FIG. 4 shows this heating device in a side view.

With reference to FIGS. 2 and 4, the heating device 10 has for each unit 73 four treatment zones arranged following each other in the direction of movement, namely a first heating zone TH1 at the level of the first heating body 85, a first balancing zone TE1, a second heating zone TH2 at the level of the second heating body 85 and a second balancing zone TE2.

The pre-forms and their conveyors 8 are moved in an indexed manner such that the pre-forms 2 are stopped in stop positions located facing the flat cooling air flows 72 separated from each other by an interval corresponding to the distance separating the middles of the two successive conveyors. The dwell time of a pre-form in one zone depends on the length of the zone, hence on the number of stop positions.

Thus, the first heating zone TH1 comprises between two and ten stop positions. In this zone, the wall of the pre-form is intensely heated and the temperature of the external surface increases more rapidly than that of the internal surface.

The following zone, which is the first balancing zone TE1, comprises between four and 20 stop positions. This zone has no heating body. It permits a balancing of the temperature through the wall of the pre-form considering that the external surface is subjected to more marked cooling than the internal surface of the wall of the pre-form. In the second half of this zone, the temperature is even inverted because the external surface of the wall of the pre-form becomes colder than the internal surface.

The following zone corresponds to the second heating zone TH2 and has a heating body 85 similar to that of the zone TH1, of course given that the adjustment of the heating tubes 89 can be different in the two zones. In this zone, the heating permits obtaining a temperature profile along the pre-form, the temperature of the external surface again becomes higher than that of the internal surface. This zone comprises between two and ten stop positions. The heating in the first zone TH1 is substantially more intense than that in the second zone TH2 which is devoted above all to profiling the temperatures along the pre-forms.

This zone is followed by a second balancing zone TE2 without a heating body. It can be partially free from ventilation and comprise between one and ten stop positions. This zone permits supplemental adjustment between the external and internal temperatures of the pre-form just before the latter will be introduced into the drawing-blowing device 12. In fact, the external temperature again becomes slightly lower than the temperature of the internal surface. It should be noted that ventilation is provided in the four zones, hence also in the two heating zones. Only the combination of ventilation and heating in the stop positions of the first and third zones (TH1, TH2) permits very rapid and efficacious heating whilst avoiding crystallization of the surface of the pre-forms.

The rotation of the pre-forms 2 and their supports 7 about their axis can also be of an indexed nature. There could be provided one drive device 53 per zone TH1, TE1, TH2, TE2, which thus permits a different speed of rotation for each zone.

There could also be provided a different drive device for two or three zones together. The longitudinal stepwise movement is also indexed such that the pre-forms are completely stopped during predetermined durations in precise positions with respect to the cooling flows 72.

The very precise blowing of air during the heating and balancing phases ensures effective protection of the pre-form against any undesired crystallization. The blowing of air onto the neck of the pre-form 2 and the upper portion of the supports 7 permits avoiding deformations of the neck of the pre-form.

It is to be noted that at the outlet of the heating device 10, the temperature of the external surface of the pre-forms is lower than that of the internal surface, which is desirable for precise molding in the drawing-blowing device, given that the internal surface moves a greater distance than the external surface of the pre-form during molding.

The development of the temperatures of the external surface Tex and of the internal surface Ten of the wall of the pre-forms plays an important role in the quality of the produced products. The assembly is adjusted to obtain a strong increase of temperatures in the first temperature zone TH1 with a greater slope for the temperature of the external wall.

In the balancing zone TE1, the temperature of the external surface falls substantially below that of the internal surface. The increase of the temperatures is less strongly regulated in the profiling zone TH2 with a more pronounced slope for the temperature of the external surface, which again becomes higher in temperature than the internal surface. Finally, the temperatures of the external and internal surfaces are again inverted in the second balancing zone TE2, so as to obtain an optimum spread Tin-Tex for drawing-blow-molding.

Of course the embodiment described above is not limitative and can be the subject of any desirable modifications within the scope defined by claim 1. In particular, the machine could have another number of pairs 65 of rows of pre-forms. The number of stop positions in each zone could be different. The machine could have more than four processing zones, for example six zones with two final heating and balancing zones. The machine could also be adapted for the production of other hollow bodies than receptacles in the strictest sense. The sliding mechanisms could be different, for example in the form of drawers. The heating bodies 85 could be differently arranged, they could for example be provided with a single series of bidirectional heating tubes.

What is claimed is:

1. Machine for the production of plastic receptacles comprising a chassis (1) and arranged along a guide path (20) at least one heating device (10) and a blow-molding device (12), the receptacles being formed from pre-forms (2) disposed on conveyors (8) moved in a movement direction (x) along the guide path (20), the heating device (10) comprising heating elements (70) mounted facing at least one row of pre-forms, characterized by the fact that the heating device (10) comprises, associated with the different rows of pre-forms, sliding mechanisms (95) arranged so as to permit withdrawing and reintroducing individually the heating elements (70) of a predetermined row relative to the other heating elements associated with other rows of pre-forms and relative to a fixed frame (41) of the heating device.

2. Machine according to claim 1 comprising pairs of parallel rows (66) of pre-forms (2) at the level of the heating device (10), characterized by the fact that the heating elements (70) are disposed between the parallel rows of pairs (66) and mounted on sliding mechanisms (95) such that the heating elements (70) associated with a pair of parallel rows (66) can be withdrawn from the heating element (10) relative to the other heating elements associated with the other pairs of parallel rows (66) by sliding in said movement direction (x).

3. Machine according to claim 2, characterized by the fact that the sliding mechanism comprises two telescopic devices (95) fixed above the two rows (66) of pre-forms to the frame (41) of the heating device (10), the heating elements (70) being suspended from cross-pieces (86) connecting the two telescopic devices (95).

4. Machine according to claim 3, characterized by the fact that the heating elements are distributed in two heating bodies (85) arranged one behind the other on the sliding mechanism and separated by a predetermined distance.

5. Machine according to claim 4, characterized by the fact that each heating body (85) comprises two parallel series (87, 88) of heating tubes (89) substantially superposed and mounted facing two rows (66) of pre-forms on vertical suspension bars (90) connected to the sliding mechanism (95).

6. Machine according to claim 5, characterized by the fact that the heating tubes (89) are adjustably mounted on suspension bars (90) such that the distance separating them from the pre-forms (2) can be individually adjusted.

7. Machine according to claim 1, characterized by the fact that the heating device (10).comprises a frame (41) with feet (43) whose length can be adjusted by a single mechanism with pinions and a chain (45, 46) such that the position of the assembly of the heating elements (70) relative to the pre-forms can be vertically adjusted.

8. Machine according to claim 2, characterized by the fact that the heating device (10) comprises at least three sliding mechanisms (95) disposed parallel to each other and whose heating elements (70) are disposed in the middle of three pairs (65) of rows (66) of pre-forms, each sliding mechanism (95) being arranged so as to permit withdrawing individually the heating elements (70) located between two adjacent rows (66) of pre-forms.

9. Machine according to claim 2, characterized by the fact that the heating device (10) comprises ventilating elements (71) in the form of two lateral ventilating chambers (74, 75) fixedly mounted on the two sides of each pair (65) of ranges (66) of pre-forms and provided with openings directed in the direction of the pre-forms and in the form of a central ventilation conduit (78) mounted fixedly between the two rows (66) of a pair of rows (65) of pre-forms and below said heating elements (70) and having openings directed in the direction of the mix of the pre-forms (2) and of the supports (7) of the pre-forms.

10. Machine according to claim 1, characterized by the fact that the heating device (10) comprises at least four successive zones arranged in the direction of movement (x) and ventilation means adapted to send the flow of air over the surface of the pre-forms, a first zone (TH1) comprising heating elements (70) adapted to produce heating of the pre-forms (2), a second zone (TE1) permitting balancing of the thermal conditions of the wall of the pre-forms (2) by cooling their external surface, a third zone (TH2) comprising heaters (70) adapted to produce a second heating of the pre-forms and a fourth zone (TE2) permitting final balancing of the thermal conditions of the pre-forms (2) before their transfer into the blow-molding device, the heating device having ventilation means in the heating zones and in the balancing zones, these ventilation means being arranged so as to send an air flow oriented perpendicularly against the surfaces of the pre-forms in the balancing zones (TE1, TE2) and in the two heating zones (TH1, TH2), these latter having positions in which the pre-forms are simultaneously subjected to heating radiation and to the flow of air.

11. Machine according to claim 10, characterized by the fact that each of the four zones (TH1, TE1, TH2, TE2) comprises a predetermined number of stop positions in which the pre-forms (2) are stopped for predetermined time intervals, the ventilation means being arranged in the four zones so as to direct in these stop positions a substantially vertical air flow in the direction of the pre-forms, which are rotated about their longitudinal axes by means of at least one drive device (53).

12. Machine according to claim 11, characterized by the fact that conveyor means (28) are arranged so as to move the pre-forms (2) in an indexed manner such that the pre-forms will be stopped for a predetermined duration in the stop positions.

13. Machine according to claim 11, characterized by the fact that the drive device or devices (53) are arranged so as to rotate the pre-forms (2) in an indexed manner.

14. Machine according to claim 10, characterized by the fact that the heating device (10) is arranged so as to carry out in the first zone (TH1) a heating and a ventilating such that the external surface of the pre-forms is at a higher temperature than that of the internal surface, to carry out in the second zone (TE1) a balancing by ventilation such that the temperature of the external surface becomes lower than that of the internal surface, to carry out in the third zone (TH2) a ventilation and an overall heating of the pre-form less pronounced than in the first zone, and to carry out in the fourth zone (TE2) balancing conditions by ventilation such that the temperature of the external surface is lower than that of the internal surface of the pre-forms at the outlet of the heating device (10).

\* \* \* \* \*